United States Patent
Kuvaja et al.

(10) Patent No.: US 10,744,513 B2
(45) Date of Patent: Aug. 18, 2020

(54) DETECTION OF BRIDGING IN GYRATORY OR CONE CRUSHER

(71) Applicant: Metso Minerals, Inc., Helsinki (FI)

(72) Inventors: Kari Kuvaja, Tampere (FI); Mika Peltonen, Tampere (FI)

(73) Assignee: Metso Minerals, Inc., Helsinki (FI)

(*) Notice: Subject to any disclaimer, the term of this patent is extended or adjusted under 35 U.S.C. 154(b) by 365 days.

(21) Appl. No.: 15/560,233

(22) PCT Filed: Apr. 5, 2016

(86) PCT No.: PCT/FI2016/050210
§ 371 (c)(1),
(2) Date: Sep. 21, 2017

(87) PCT Pub. No.: WO2016/162598
PCT Pub. Date: Oct. 13, 2016

(65) Prior Publication Data
US 2018/0050345 A1 Feb. 22, 2018

(30) Foreign Application Priority Data

Apr. 8, 2015 (FI) .................................... 20155253

(51) Int. Cl.
*B02C 25/00* (2006.01)
*B02C 2/04* (2006.01)
(Continued)

(52) U.S. Cl.
CPC ................ *B02C 25/00* (2013.01); *B02C 2/00* (2013.01); *B02C 2/02* (2013.01); *B02C 2/04* (2013.01);
(Continued)

(58) Field of Classification Search
CPC ................................. B02C 25/00; B02C 2/047
See application file for complete search history.

(56) References Cited

U.S. PATENT DOCUMENTS

| | | |
|---|---|---|
| 313,818 A | 3/1885 | Fraser |
| 1,507,970 A | 9/1924 | Lazier |
| (Continued) | | |

FOREIGN PATENT DOCUMENTS

| | | |
|---|---|---|
| JP | 3145819 B2 | 3/2001 |
| WO | 2010/104447 A1 | 9/2010 |

OTHER PUBLICATIONS

Search Report for Finnish Application No. 20155253 dated Dec. 3, 2015.
(Continued)

*Primary Examiner* — Faye Francis
(74) *Attorney, Agent, or Firm* — Andrus Intellectual Property Law, LLP

(57) ABSTRACT

A method, crusher, computer program and crushing plant, in which bridging generated on an arm is detected in a crusher that has a body, an outer wear part fixed to the body, an outer wear part fixed to the body; a support cone rotatable inside the body via a main shaft); an inner wear part on a cone surface of the support cone; and a support of the support cone. The support contains a group of arms inside the body and extending inwards from the body; a main shaft radially supported to the arms; and a thrust bearer supported by the arms for supporting the main shaft and for axially supporting the support cone via the main shaft. The crusher crushes mineral material between the inner wear part and the outer wear part. Measurement information is received describing stress of the support of the support cone; and bridging formed onto an arm is detected from the measurement information.

19 Claims, 5 Drawing Sheets

(51) Int. Cl.
  *B02C 2/02* (2006.01)
  *B02C 2/00* (2006.01)
  *G01L 1/22* (2006.01)
  *G01L 5/00* (2006.01)
  *G01L 19/00* (2006.01)

(52) U.S. Cl.
  CPC .............. *B02C 2/047* (2013.01); *G01L 1/22* (2013.01); *G01L 5/0061* (2013.01); *G01L 19/0092* (2013.01)

(56) References Cited

U.S. PATENT DOCUMENTS

| | | | |
|---|---|---|---|
| 2,079,882 A | | 5/1937 | Traylor |
| 2,667,309 A | | 1/1954 | Becker |
| 3,372,881 A | | 3/1968 | Winter |
| 5,074,435 A | * | 12/1991 | Suverkrop .............. B02C 21/02 177/50 |
| 8,540,175 B2 | * | 9/2013 | Torres ..................... B02C 2/047 241/30 |
| 2006/0243833 A1 | | 11/2006 | Nilsson |
| 2010/0230519 A1 | * | 9/2010 | Torres ..................... B02C 2/047 241/25 |

OTHER PUBLICATIONS

International Search Report and Written Opinion for PCT/FI2016/050210 dated Jul. 18, 2016.

* cited by examiner

DETECTION OF BRIDGING IN GYRATORY OR CONE CRUSHER

CROSS-REFERENCE TO RELATED APPLICATIONS

This application is the U.S. national stage application of International Application PCT/FI2016/050210 filed Apr. 5, 2016, which international application was published on Oct. 13, 2016, as International Publication WO 2016/162598 in the English language. The International Application claims priority of Finish Patent Application 20155253, filed Apr. 8, 2015.

TECHNICAL FIELD

The present invention relates to detection of bridging in a gyratory or cone crusher.

BACKGROUND ART

This section illustrates useful background information without admission of any technique described herein representative of the state of the art.

Rock is gained from the earth for crushing by exploding or excavating. The rock can also be natural rock and gravel or construction waste. Both mobile crushers and stationary crushing applications are used for crushing. An excavator or wheeled loader loads the material to be crushed to a feed hopper of the crusher, from where the material to be crushed may fall in a chute of a crusher or a feeder moves the rock material towards the crusher.

In a gyratory or cone crushers, mineral material is crushed by moving an inner blade (crushing cone) with relation to a fixed outer blade. The inner and outer blade define therebetween a crushing chamber. As known, the gyratory and cone crushers are adjusted for different production demands by changing the profile of the crushing chamber, the extent of acentric movement of the crushing cone i.e. the stroke, the rotation speed of the crushing cone and the setting of the crusher.

It is attempted to make full use of the crushing capacity of a gyratory or cone crusher so that the crusher is being loaded continuously with a great crushing power and at the same time the used crushing power is directed to produce desired product distribution. Interruptions in the crushing process reduce efficiency.

Material may accumulate between the inner blade i.e. wear part and an arm of a crusher body, the support cone and slide ring, or output hopper and the support cone and cause an undesired condition referred to as bridging in which the material carries the support cone from underneath. In this description, bridging is not used to deal with another meaning of bridging in which the feed opening of the crusher becomes blocked by objects large enough to enter the crushing chamber but unable to do so, because getting stuck sideways in the feed opening or they block the entry from each other and the feed becomes prevented. The bridging of a gyratory or cone crusher that forms underneath the support cone is yet different in that the bridging may start carrying the support cone.

Bridging forming between a support cone of a gyratory or cone crusher and an underlying arm may be caused by impure feed (e.g. a rag, reinforcing bar, tree stump) accumulating onto an underlying arm of the support cone so that bridging begins to form with the material that is being crushed and the bridging starts to carry the support cone. The bridging may be caused by an oil leak, to which bigger stones get stuck with dust and sand and ultimately a bridge is forms onto the arm and carries the support cone. When the bridging material starts to carry the support cone, an upper thrust bearing that supports the support cone disconnects from the pressure plate and a bearer failure occurs. The bridged material may cause fast wearing and breaking of a dust seal of the crushing cone and in that way fast contamination of oils by dirt. The bridging typically resides on only one side of the main shaft bending the support cone or main shaft askew and also the cam bearing of the crusher may become damaged. For preventing bridging a wiper is arranged in some crushers in connection with the support arm to wipe the arms. The wiper may have short life, because it may, for example, break away and it is also exposed to wearing caused by heavy abrasion. Additionally, the operator of the crusher may overly trust in the presence of the wiper and thus not necessary recognize beginning of bridging before damaging of the crusher.

An objective of the invention is to detect bridging of a gyratory or cone crusher especially during crushing. An objective of the invention is to pre-inhibit possible damage caused by bridging. An objective of the invention is to improve usability and efficiency of a crusher.

SUMMARY

According to a first aspect of the invention there is provided a method for detecting bridging in a crusher, the crusher comprising: a body; an outer blade i.e. an outer wear part fixed to the body; a support cone rotatable inside the body via a main shaft; an inner blade i.e. an inner wear part on a cone surface of the support cone; and a support of the support cone, the support comprising: a group of arms inside the body and extending inwards from the body;

a main shaft radially supported to the arms; and a thrust bearer supported by the arms for supporting the main shaft and for axially supporting the support cone via the main shaft; and which crusher is arranged to crush mineral material between the inner wear part and the outer wear part.

It is characteristic to the method that measurement information is received describing stress of the support of the support cone; and detecting bridging formed onto an arm from the measurement information.

The stress may be measured by a strain-gauge strip.
The stress may be measured by a displacement sensor.
The thrust bearer of the crusher may be arranged to be supported by the arms with a hydraulic cylinder.

The measurement information may comprise the pressure of the hydraulic cylinder i.e. the pressure prevailing in the hydraulic fluid of the hydraulic cylinder. On starting the crusher, the measurement information may be received of the pressure of the hydraulic cylinder. The starting of the crusher may be prevented if the pressure is below a predetermined low limit for floating pressure.

In connection with the drive of the crusher, the measurement information may be received of the pressure of the hydraulic cylinder.

In the method, it may be detected whether there is material to be crushed in a crushing chamber and the crusher be stopped, if the detecting indicates that there is still material to be crushed and the pressure is under the predetermined low limit for the floating pressure.

The measurement information may comprise the power intake of the drive during crushing. Ratio between said power and the pressure may be compared. The crusher may stopped if the power with relation to the pressure exceeds a first threshold value.

An average stress of the support of the support cone may be computed from the measurement information. The average may be computed over multiple revolutions of the support cone. The average may be compared with a second threshold value. The crusher may stopped if the average exceeds a second threshold value.

The measurement information may indicate the ratio of horizontal and vertical forces directed to the body via the arms. The crusher may be stopped if said ratio increases by at least 10%.

The power of the crusher may indicate said horizontal force. The power of the crusher divided by the rotation speed of the crusher may indicate said horizontal force.

The pressure of the hydraulic cylinder may indicate said vertical force.

Variation of the ratio of the arm stress may be determined during repeating measurement rounds.

The variation of the stress may be measured by a sensor fixed to the arm. Alternatively or additionally the arm stress variation may be measured by a sensor fixed to the body at a distance from the arm of the body.

In the method, bridging may be pointed at the arm at which the arm stress variation has significantly changed with relation to the stress variation of the other arms.

In the method, bridging may be pointed at the arm at which the arm stress variation significantly differs from the stress variation of the other arms.

In the method, bridging may be pointed at the arm at which the arm stress variation has significantly exceeds the stress variation of the other arms.

Variation range of the arm stress may be determined. The bridging may be indicated when the variation range significantly increases.

In the method, the arm to which the bridging directs may be detected from at least one of the following:
  the arm stress variation has significantly changed with relation to the stress variation of the other arms;
  the arm stress variation of an arm significantly differs from the arm stress variation of the other arms;
  the arm stress variation of an arm significantly exceeds the arm stress variation of the other arms; and
  the variation range of the arm stress variation of an arm significantly increases.

The arm stress variation may be measured by a strain-gauge strip.

The arm stress variation may be measured by a sensor capable of displacement measurement.

The arm stress variation may be measured from support points that are arranged to support the crusher body to a structure outside of the body.

The bridging may be indicated as a signal at least to a user of the crusher or to a crushing drive of the crusher.

According to a second aspect of the invention there is provided a method for monitoring and controlling a gyratory or cone crusher, the gyratory or cone crusher comprising a body and two arms formed to the body, a main shaft supported from lower end to the arms, and a support cone supported to the main shaft. In the method, loading of the crusher is decreased responsively to that bridging is detected with any method of the first aspect.

The crusher may comprise three arms formed to the body.

Responsively to the detecting of the bridging one or more of the following may be performed: reduce material feed to the crusher; interrupt material feed to the crusher; change composition or size of the material fed to the crusher; interrupt rotation of the support cone; and issue to the operator an alarm of bridging.

According to a third aspect of the invention there is provided a gyratory or cone crusher that comprises a body; an outer blade i.e. an outer wear part fixed to the body; a support cone rotatable inside the body via a main shaft; an inner blade i.e. an inner wear part on a cone surface of the support cone; and a support of the support cone, the support comprising: a group of arms inside the body and extending inwards from the body; a main shaft radially supported to the arms; and thrust bearer supported by the arms for supporting the main shaft and for axially supporting the support cone via the main shaft; and which crusher is arranged to crush mineral material between the inner wear part and the outer wear part. The crusher may comprise means for receiving measurement information describing stress of the support and for detecting bridging formed onto an arm from the measurement information. The crusher may comprise a controller configured to receive measurement information describing stress of the support and to detect bridging formed onto an arm from the measurement information. The controller may comprise a processor and computer program code.

According to a fourth aspect there is provided a computer program that comprises computer program code configured to implement, when executed by a computer, the method of any of the first aspect.

According to a fourth aspect there is provided a crushing plant that comprises a crusher according to any of the third aspect or the computer program according to the fourth aspect.

By detecting in time from the arms stress variation the beginning of bridging a potential bearing failure may be prevented or expansion of the failure may be prevented before the bearing gets scratched or ultimately seizure of the bearing. It may be possible to save the bearing by running the crusher on idle after bridging indication or alarm. In some cases, the bearing may be mended by reducing or interrupting the material feed to the crusher.

Different embodiments of the present invention are described or have been described only with reference to particular aspects. The person skilled in the art understands that the any embodiment of one aspect may be applied alone or in combination with other embodiments in the same or other aspects.

BRIEF DESCRIPTION OF THE DRAWINGS

The invention will now be described by way of example with reference to the accompanying drawings, in which.

DETAILED DESCRIPTION

In the following description, like reference signs denote like parts. It should be noticed that the illustrated drawings are not entirely in scale and that they mostly serve to demonstrate some embodiments of the invention.

Figure 1:
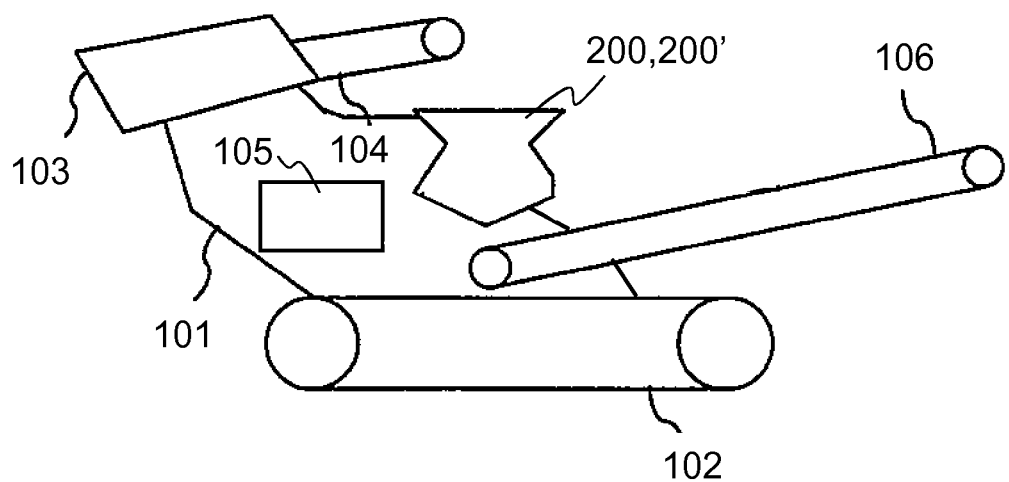
FIG. 1 shows a crushing plant that comprises a gyratory or cone crusher of an embodiment.

FIG. 1 shows a mobile track based mineral material processing plant 100 that comprises a body 101, a track base 102, a feeder 103 and a crusher, such as a gyratory crusher 200 or a cone crusher 200'. The feeder preferably comprises also a conveyor 104. The crushing plant 100 further comprises a motor unit 105 for driving the crusher and the conveyor 106 for conveying the crushed material to a heap, for example. Preferably, the motor unit 105 comprises a crushing drive that can be controlled with a crusher control arrangement. The crusher may be used, for example, as an intermediate or secondary crusher. In particular, the crusher can be used in fine crushing. The mobile processing plant may be movable also with other means such as wheels, skids or legs. The crushing plant may also be stationary.

The crushing plant preferably comprises a feed hopper above a feed opening of a crushing chamber of the crusher (not depicted in drawing). During crushing process, the material to be crushed is fed (by an excavator, for example) to a feeder 103 wherefrom it is further fed onto the crusher. Material being crushed that arrives from the feeder/conveyor is directed with the feed hopper to the feed opening of the crushing chamber. The material to be crushed may also be fed into the feed hopper directly using an excavator, for example.

Figure 2:
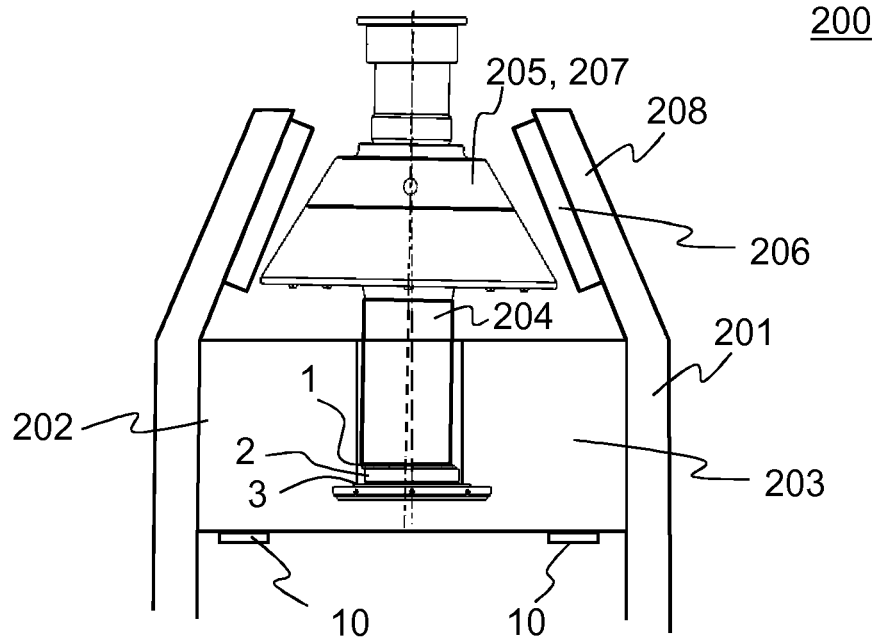
FIG. 2 shows a gyratory crusher according to an embodiment, in which gyratory crusher there is a monitoring arrangement according to a first example.

FIG. 2 shows a gyratory crusher 200 that comprises an orbicular body 201 and two arms 202, 203 formed to the body, the arms preferably extending radially inside the body. The gyratory crusher comprises a main shaft 204 that is rotationally supported from underside to the arms that form in the middle of the crusher a support structure for the main shaft. An upper part 1 of a thrust bearing is fixed to the bottom of the main shaft and a lower part 3 of the thrust bearing is fixed to be supported by the arms. Between the upper and lower parts there is arranged a thrust plate 2. The setting of the gyratory crusher can be adjusted by elevating and lowering the lower end of the thrust bearing with relation to the body 201. The supporting of the main shaft to an upper body 208 fixed to the body 201 is not shown. The gyratory crusher comprises a support cone 205 supported to the main shaft. The crushing chamber of the crusher resides between a stationary outer wear part or outer blade 206, and an inner wear part or inner blade 207. The outer wear part 206 is fixed to the upper body 208 and the inner wear part 207 is fixed onto the support cone 205.

Figure 3:
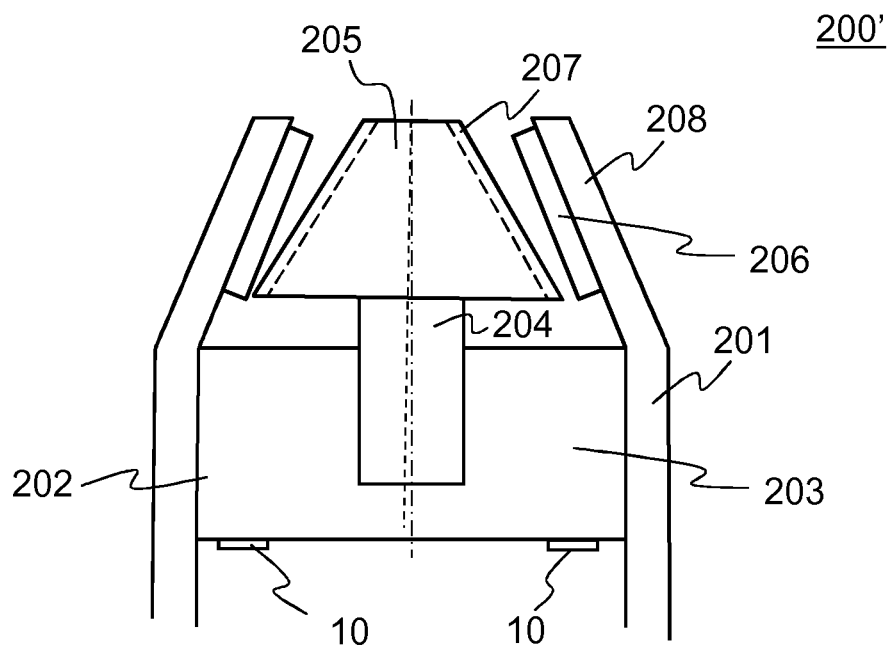
FIG. 3 shows a cone crusher according to an embodiment, in which cone crusher there is a monitoring arrangement according to a first example.
Figure 4:
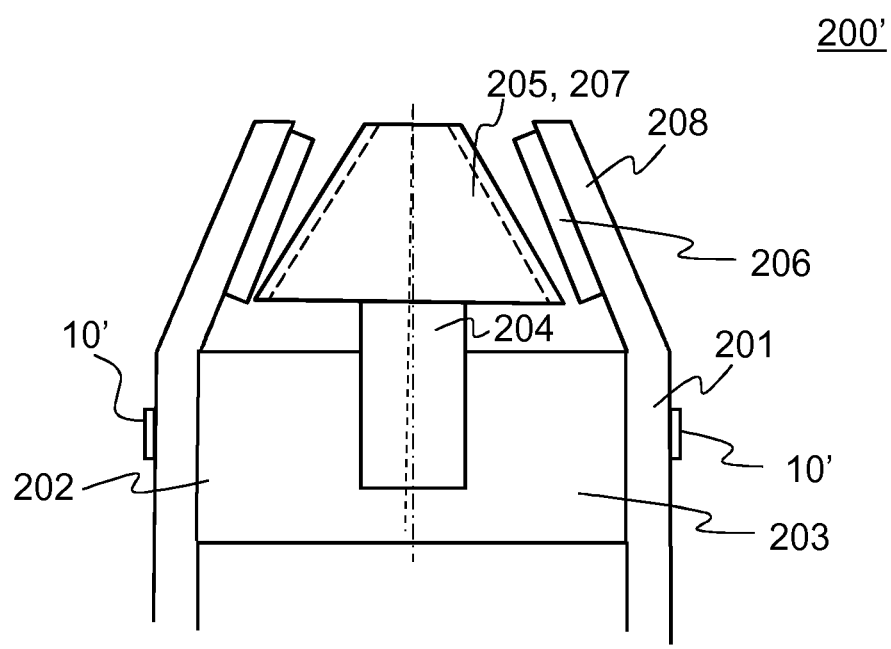
FIG. 4 shows a cone crusher according to an embodiment, in which cone crusher there is a monitoring arrangement according to a second example.
Figure 5:
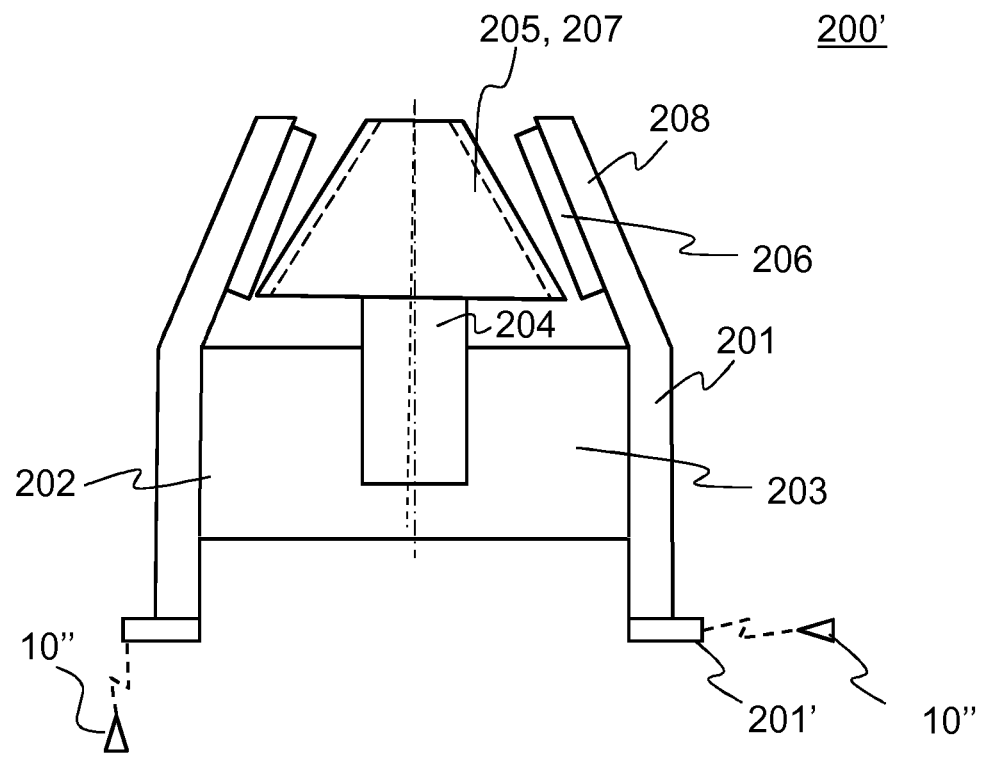
FIG. 5 shows a cone crusher according to an embodiment, in which cone crusher there is a monitoring arrangement according to a third example.

FIGS. 3, 4 and 5 show in a simplified manner a cone crusher 200' that comprises a body 201 and two arms 202, 203 formed to the body, which arms preferably extend radially from an inner surface of the orbicular body 201 to the support of the lower part of the main shaft 204. The cone crusher comprises the main shaft 204 and the support cone 205. The lower end is fixed to be supported by the arms and the support cone is arranged to eccentrically rotate about the main shaft. The support cone is eccentrically rotationally supported to the upper end of the main shaft by a thrust bearing (not shown). The setting of the cone crusher can be adjusted by elevating and lowering the upper body 208 fixed to the body 201. The crushing chamber of the crusher resides between an outer wear part 206, and an inner wear part 207. The outer wear part 206 is fixed to the upper body 208 and the inner wear part 207 is fixed onto the support cone 205.

The crushers shown in FIGS. 2 to 5 each comprise a monitoring arrangement comprising sensors configured to measure stress variation of each arm. According to an embodiment, there are provided first, second or third sensors 10; 10'; 10" to measure strain variation of the arms. The monitoring arrangement is configured to measure arm strain variations of each arm during repeating measurement rounds for monitoring bridging of the crusher. Typically, arm strain varies between pull and compression. Variation range of the strain variation i.e. the difference between minimum and maximum strain can be monitored by the monitoring arrangement.

In FIGS. 2 and 3 an underside of the arm 202, 203 is shown as a fixing position of the sensor 10. For example, a strain-gauge strip can be fixed to a bottom surface of the arm, where the sensor can easily be protected from the flow of the material. FIG. 4 shows as a fixing location of the sensor 10' a location in the body 201 of the crusher external to the arm 202, 203. The sensor is fixed outside of the body. The sensor can also or alternatively be fixed inside the body. For example, the strain-gauge strip can be fixed to a surface of the body. Measurement of a sensor arranged on an external surface of the body at a distance from the arm can be arranged to correlate with the strain variation of the arm.

FIG. 5 shows as a fixing position of the sensor 10''' a location outside the arm 202, 203. The sensor is arranged to measure arm strain variation from support points 201' that are arranged for supporting the crusher body to a structure exterior to the body, e.g. on feet of the crusher body. The support point need not be aligned at the arm as long as the measurement correlates with strain variation of a desired arm. A sensor or sensors measuring vertical forces can be positioned additionally or alternatively to the main shaft, on the main shaft, and/or to the thrust bearing. Horizontal forces can be measured by sensors among others from the arms (lower arms or in case of a top bearing equipped crusher possibly from an upper arm), radial bearings, top bearing, and/or from the main shaft. Both vertical and horizontal forces can be measured among others between the wear part and the body and/or at fixing points of the outer wear part. The monitoring arrangement of FIG. 5 is implemented with a sensor type capable of displacement measurement. The measurement from the support points can be carried out with a contactless sensor.

The bridging between the support cone 205 of the crusher and the arm 202, 203 is detected in response to some arm variation change with relation to strain variations of the other arms.

It is possible to determine by the monitoring arrangement during repeating measurement rounds the ratio of arm strain variations to each other, among others by measuring arm strain variation with a sensor fixed to the arm. The sensor can be fixed at a distance from the arm, for example outside the body, and the sensor need not be exactly aligned at an arm as long as the measurement correlates with the strain variation of this arm.

With the measurements of the method and the monitoring arrangement it is possible to detect directing of bridging to that arm the arm strain variation of which has significantly changed with relation to the arm strain variation of the other arms; or to that arm the arm strain variation of which differs significantly from the arm strain variation of other arms; or to that arm the arm strain variation of which is significantly greater than the arm strain variation of other arms. Preferably a range of arm strain variation is being measured and bridging is detected on significant increase of the range. With the method, bridging can be indicating as a signal to an operator of the crusher and/or to a drive of the crusher.

The arm strain variation is preferably measured by a strain-gauge strip or a sensor capable of displacement measurement such as a distance sensor.

In an embodiment, the crusher support cone has a support formed by the arms and the thrust bearing of the main shaft. The support carries the support cone and the force caused by the crushing forces in vertical and horizontal directions.

In an embodiment, the horizontal and vertical forces directed to the body are separately measured i.e. at an arm, forces against the wall of the body and parallel to the wall. Based on the ratio of the horizontal and vertical forces, bridging of an arm can be deduced.

In addition to the monitoring arrangement, the crusher comprises a control arrangement with which the crusher can be controlled by reducing loading of the crusher responsively to the detecting of bridging. At minimum, the loading of the crusher may be reduced to zero i.e. the crushing be stopped by, for example, preventing feed to the crusher or stopping the rotation of the inner wear part. One option is the change of feed size or composition. Preferably, an alarm is issued to the user when bridging is detected.

Potential bridging of the crusher is monitored with help of the monitoring arrangement. The bridging detection of a crusher is used for adjusting the crusher. The adjusting may occur either by action of the user or automatically through control of the crusher. The crusher control aims, among others, to preparing in advance to potential crusher damages, ensuring efficient crushing act and to reducing crusher loader up to stopping before damaging of the crusher.

In the same crusher same, it is possible to use the measurement ways and measurement sensors of same and different types as shown in FIGS. 2, 3, 4, and 5 without restricting the scope and application. The measurement ways and measurement sensors shown in connection with FIGS. 3, 4 and 5 can be used in connection with gyratory and cone crushers.

Figure 6:
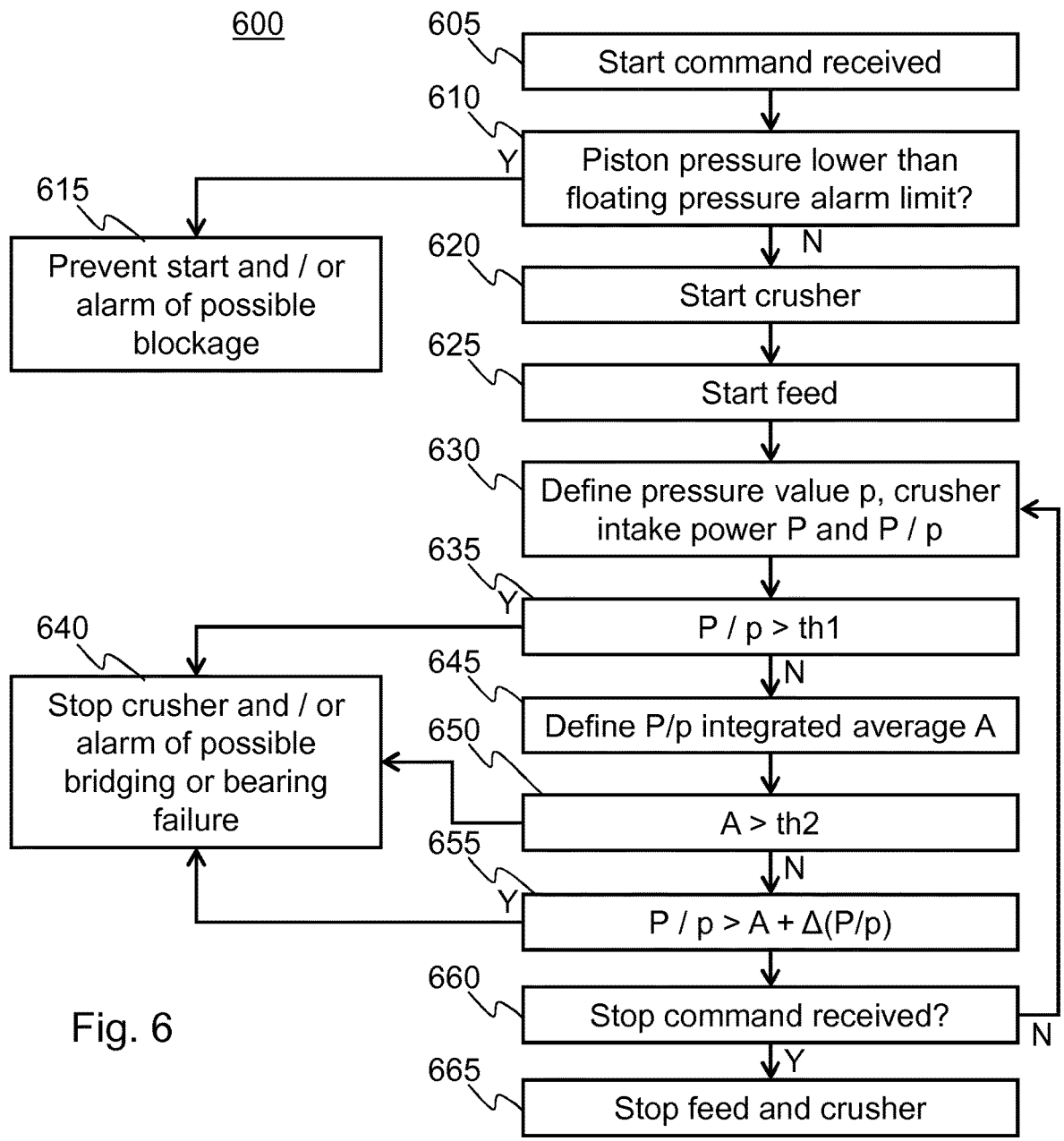
FIG. 6 shows a flow chart of a process according to an embodiment.

FIG. 6 shows a flow chart of bridging detection in a process 600 according to an embodiment. The process 600 starts when the crusher controller receives a crusher start command, 605. A piston pressure is checked 610. The piston pressure i.e. the pressure prevailing in the hydraulic cylinder adjusts loading of the crusher and indicates the vertical force received by the inner wear part. In this step it may be checked whether the piston pressure is less than an alarm limit of floating pressure (floating pressure referring to a vertical force directed to the thrust bearing of the crusher in an unloaded state in which the crushing chamber has no material to be crushed).

If the pressure goes under the alarm limit, the crusher is stopped and/or an alarm is issued of a possible blockage, 615. Otherwise, the crusher is started 620 and the feeding of the crusher is started 625. The crusher piston pressure is began to be monitored in a loop, in which the pressure value p, crusher intake power P and the ratio of the power to the pressure P/p is determined, 630. The crusher intake power P indicates horizontal power directed to the arms. The intake power P ratio to the pressure p can be determined momentarily or as a short term average over, for example, 0.1; 0.5; 1; 2; 3; or 5 seconds.

The ratio P/p is compared to a first threshold value th1, 635. If P/p>th1, the crusher is stopped and/or an alarm is issued of possible bridging or bearing failure, 640. Otherwise, there is formed of the ratio P/p an integrated or a longer term average A as a 60 second sliding average, for example, 645. The average A can be formed over the time of plural revolutions of the support cone. The average A is compared to a second threshold value th2, 650. If A>th2, it is proceeded to step 640, otherwise it is proceeded to compare 655 whether P/p>A+$\Delta$(P/p), wherein $\Delta$(P/p) is the greatest change of P/p during a given period of time, for example the duration of the forming window of the longer term average A (60 s, for example). If the comparison result is yes, then it is proceeded to step 640, otherwise it is proceeded to check whether a stopping command is received to stop the crusher. If not, it is returned to step 630, otherwise the feeding and the crusher are stopped, 665.

Alternatively to measuring the power to pressure ratio it is possible to measure only the power and to detect from the crushing chamber or feed hopper with a level measurement sensor (ultra-sound, laser sensor or the like), for example, whether the crusher has material to be crushed or not. If the crusher has material to be crushed, the pressure level can be compared to a threshold that can be determined, for example, as equal or greater than said formerly described floating pressure. If the pressure goes under the alarm limit, the crusher is stopped and/or it is alarmed of a possible problem.

Figure 7:
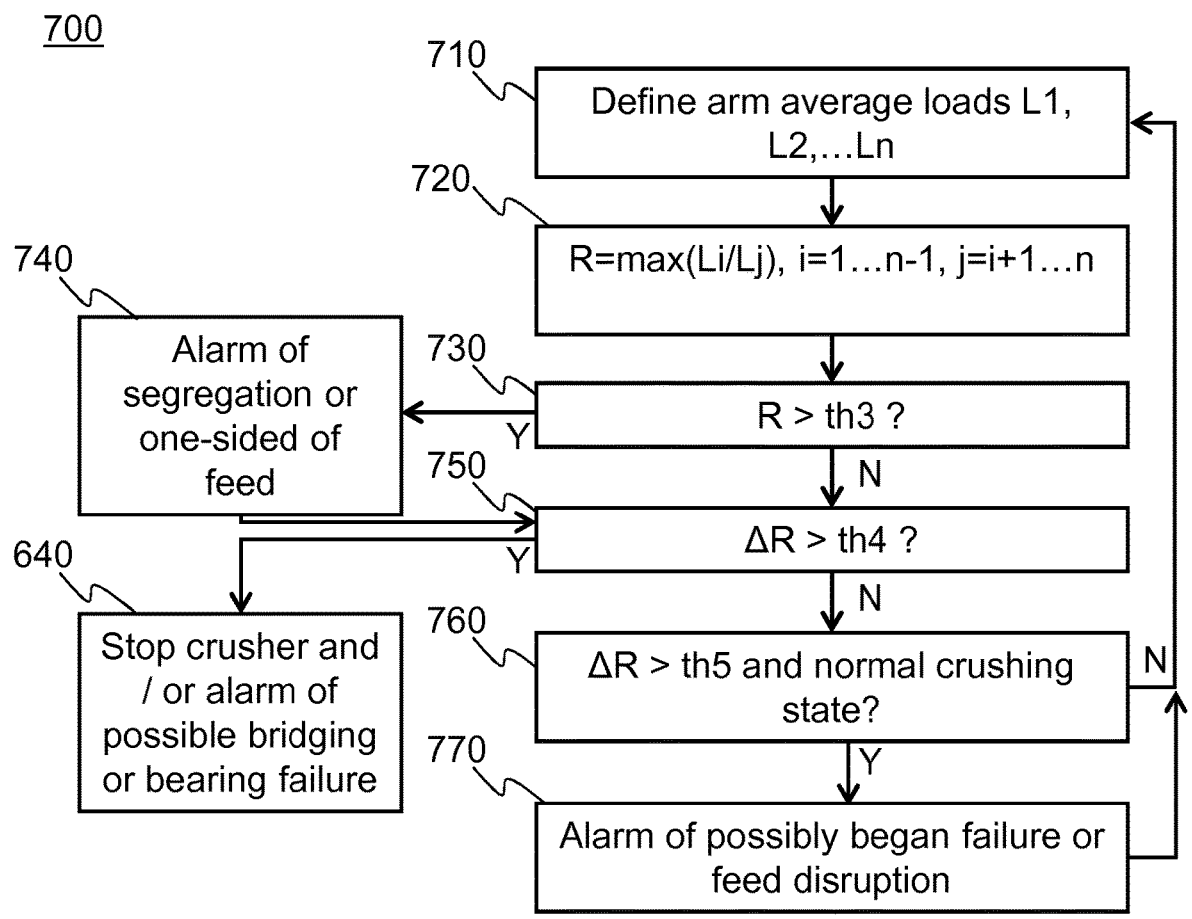
FIG. 7 shows a flow chart of a process according to an embodiment.

In an embodiment, in the process it is performed in addition to or instead of steps 630 to 655 a bridging detection process 700 based on strain difference of the arms as shown in FIG. 7. In step 710, an average strain L1, L2, . . . Ln, of each arm is determined, wherein n is the number of the arms. In step 720 the greatest ratio of two strains R between two arms i.e. the maximum strain ratio R. For example, in the case of three arms, arms 1-2, 1-3 and 2-3 are compared. In this example, the maximum strain ratio R is formed by computing the strain ratio for all arm pairs. The ratio of arm strains can be computed especially with a greater number of arms in a simplified manner by comparing a smaller number of arm pairs.

The maximum strain ratio R is compared in an embodiment in step 730 to a third threshold value th3. If the maximum strain ratio R is in normal crushing (crushing chamber full of material, for example) remarkably great (for example, greater than 1.5; 2 or 5), there is likely a segregated feed or one-sided feed. That the crushing chamber is full can be detected indirectly from crushing power, spectrum of crushing chamber vibration, ultrasound measurement and/or weighing. A corresponding alarm can be issued in step 740 of the meeting of the third threshold value th3.

In addition or instead of the maximum strain ratio R it is possible to study the change of the maximum strain ratio $\Delta$R in a given period.

In step 750 it is checked whether the change of the maximum strain ratio $\Delta$R from a given period exceeds a fourth threshold th4 and if yes, it is deduced that the bridging has occurred. In result, it may be proceeded to step 640 and the feed may be stopped and/or an alarm be issued. In an example, the fourth threshold th4 is 30% . . . 70%. In an example, the fourth threshold th4 on 35%, 40%, 45%, 50%, 55%, 60%, tai 65%.

In step 760 it is checked whether the change of the maximum strain ratio $\Delta$R from a given period exceeds a fifth threshold th5 and if yes, it is deduced that the bridging may have started or a feed disruption may have occurred. In result, it may be proceeded to step 770 and an alarm may be issued. In an example, the fifth threshold th5 is 5% . . . 20%. In an example, the fifth threshold th5 is, for example, 8%, 10%, 12% or 15%.

The fifth threshold value th5 is typically smaller than the fourth threshold value th4, otherwise the process would not continue over step 750 to step 760. In an alternative embodiment each of the used comparisons are performed in succession and all the acts triggered by the different comparisons are performed either separately or as combined. For example, an alarm may be issued that indicates to the user both that the feed appears to be segregated and that a bearing failure may have started.

The computing of the maximum strain ratio from a given period of time is implemented in FIG. 7 example by repeated computing averaged arm-specific strain difference. In another example, plural arm-specific strain difference ratios are computed and averaged over a given period of time in addition to or instead of arm-specific strains are determined by averaging. In the example of FIG. 7, there is used for sparing computation a maximum strain ratio change that is determined in a same way for comparison with the fourth and fifth threshold values. The maximum strain ratio change can be alternatively determined in different ways and/or from periods of time of different durations for the comparison to the fourth and fifth threshold value.

In FIG. 7, the crusher is only stopped possibly in step 640. In an alternative, the operator may define and/or stopping conditions have been defined in advance with which stopping conditions the crusher is automatically stopped. For example, meeting of any of the thresholds defined in this document may be set as a stopping condition.

In processes 600 and 700, support strain variation may be defined as such. In some embodiments further the angle of the main shaft is measured, whereby it is possible to detect with which angle of the main shaft there occurs the greatest or smallest strain of the support or variation of the strain of the support. Based on this information the arm can be automatically defined on which the bridging has likely formed. In an embodiment, the main shaft angle is deduced from arm strain variations.

In an embodiment, at least some of the comparisons of FIG. 7 is or are performed already before starting of the crusher. Instead of stopping the crusher the starting of the crusher may be stopped for example then if the maximum strain ratio R exceeds the third threshold value th3 or another threshold value, for example y×R, wherein y>1 (for example, 1.5; 2 or 5). Such crusher starting condition may be overridden by a command issued by the operator for a set period (such as 10 s, 20 s, 1 min or 5 min) so that the crusher may clear a fail state after stopping of the feed and/or the crusher can be run empty.

Figure 8:
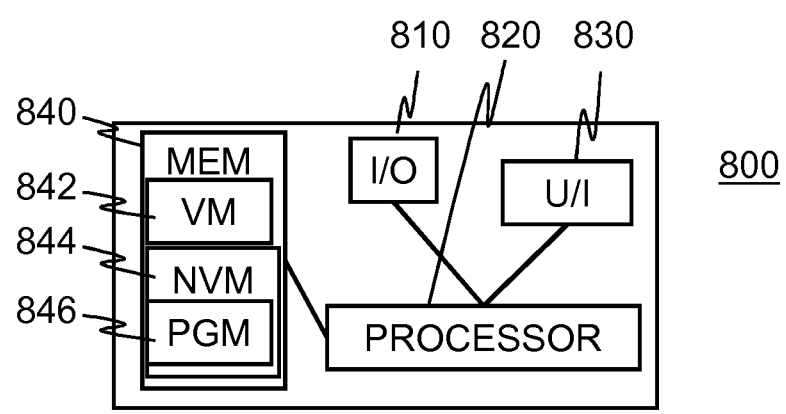
FIG. 8 shows a block diagram of a control device according to an embodiment.

FIG. 8 shows a schematic block diagram of a control device 800 for controlling a crusher. The control device comprises an input/output interface 810, a processor 820, a user interface 830 and a memory 840, in which memory there is a volatile memory 842, non-volatile memory 844 and stored in the non-volatile memory program code PGM of the control device and setting parameters that are desired to be maintained over current interruptions of the control device. The control device may be formed, for example, of a computer configured for industrial use. The input/output interface 810 may comprise one or more of the following: a local area network (LAN); current loop couplings; voltage loop couplings; field bus; universal serial bus (USB); an optical interface. The processor 820 may comprise a microprocessor; a digital signal processor; a Field programmable gate array, (FPGA); and/or any part, group of parts or circuitry capable of executing program commands. The user interface 830 may comprise, for example, a display; a keyboard; a touch display; a pointer control device such as a computer mouse or joystick; a printer; a headphone; a speaker and/or a microphone. The control device may alternatively be formed without program code using, for example, digital or analogue logic control.

The limit values used in detecting bridging may be set by using crushing simulation for setting normal ranges for the measured strains. The limit values can be specified after initial settings or be empirically set by executing a test crushing, by measuring and computing the strains and strain changes occurred during the crushing and by then determining by a suitable multiplier the values to be used in the detecting of the bridging.

The foregoing description provides non-limiting examples of particular embodiments. It is however clear to a person skilled in the art that the invention is not restricted to presented details, but that the invention can be implemented in other embodiments using equivalent means. Some features of the presented embodiments can be utilized without the use of other features. For example, the it is possible to monitor only one of the plural crusher stopping criteria or any sub-group thereof. Also the formerly described ratio and comparison of measured or computed parameters can be performed, for example, logarithmically; by use of division instead of subtraction; and/or by use of a predetermined table. An average may be computed as a sliding average in which a proportion x of a previous average is added to a proportion 1-x of a new measurement, as a geometric sliding average (for example, by raising the figures being combined to a power N and then raising their sum to a power 1/N).

Exceeding or falling under a threshold comprises alternatively in this context reaching the threshold in question. Using step 650 as an example, the crusher can be stopped as well then, if A is greater or equal to the second threshold value th2.

In some features, a ratio between two parameters is formed. Using step 635 as an example it should be understood that equally if P/p>th1, then p/P<1/th1 i.e. the ratio can be formed the other way around by inversing the comparison operator and the threshold value.

As such, the foregoing description shall be considered as merely illustrative of the principles of the present invention, and not in limitation thereof. Hence, the scope of the invention is only restricted by the appended patent claims. It should be understood, for example, that in the described methods the order of individual method steps may be changed and some steps may be repeated numerous times or be entirely omitted. It should also be appreciated that in this document, words comprise and contain are used as open-ended expressions with no intended exclusivity. For example, a crusher that comprises two arms, comprises two, three or more arms.

The invention claimed is:

1. A method for detecting bridging during operation of a crusher including a body, an outer wear part fixed to the body, a support cone rotatable inside the body by a main shaft and an inner wear part on a cone surface of the support cone, where the crusher is arranged to crush mineral material between the inner wear part and the outer wear part during operation, the method comprising:
providing a group of arms inside the body and extending inwards from the body such that the main shaft of the crusher is radially supported by the group of the arms; and
providing a thrust bearer supported by the group of arms for supporting the main shaft and for axially supporting the support cone via the main shaft;

receiving measurement information describing stress of the group of arms when supporting the support cone; and detecting bridging formed onto one or more arm of the group of arms from the measurement information.

2. The method according to claim 1, wherein the thrust bearer of the crusher is supported by the group of arms with a hydraulic cylinder, the method further comprising:

receiving, on starting the operation of the crusher, the measurement information of pressure of the hydraulic cylinder; and preventing the starting of the crusher if the pressure is below a pre-determined low limit for floating pressure.

3. The method according to claim 1, wherein the thrust bearer of the crusher is supported by the group of arms with a hydraulic cylinder, the method further comprising:

receiving the measurement information of the pressure of the hydraulic cylinder in connection with the drive of the crusher;

detecting whether there is material to be crushed in a crushing chamber; and stopping the operation of the crusher if the detecting indicates that there is still material to be crushed in the crushing chamber and the pressure is under a pre-determined low limit for floating pressure.

4. The method according to claim 1, wherein the thrust bearer of the crusher is supported by the group of arms with a hydraulic cylinder and the measurement information comprises a power intake of the drive during crushing, the method further comprising:

comparing said power intake with a pressure of the hydraulic cylinder; and stopping the crusher if the power intake with relation to the pressure exceeds a first threshold value.

5. The method according to claim 1, further comprising:

computing an average stress from the measurement information;

comparing the average stress with a second threshold value; and stopping the crusher if the average stress exceeds the second threshold value.

6. The method according to claim 1, further comprising:

indicating by the measurement information a ratio of horizontal and vertical forces directed to the body via the group of arms; and stopping the crusher if the ratio increases by at least 10%.

7. The method according to claim 1, further comprising the step of determining a ratio of stress variations during repeating measurement rounds.

8. The method according to claim 1, further comprising the step of determining a stress variation of one arm of the group of arms by a sensor fixed to the one arm.

9. The method according to claim 1, further comprising determining a stress variation of one arm of the group of arms by a sensor fixed to the crusher body at a distance from the one arm.

10. The method according to claim 1, further comprising the step of indicating at which arm of the group of arms the bridging is directed.

11. The method according to claim 10 wherein the step of determining the arm to which the bridging is directed based upon at least one of the following:

arm stress variation of the arm has significantly changed with relation to the stress variation of other arms of the group of arms;

the arm stress variation of the arm significantly differs from the arm stress variation of the other arms of the group of arms;

the arm stress variation of the arm significantly exceeds the arm stress variation of the other arms of the group of arms; and a variation range of the arm stress variation of the arm significantly increases.

12. The method according to claim 1, further comprising the step of measuring arm stress variation by a strain-gauge strip.

13. The method according to claim 1, further comprising the step of measuring arm stress variation from support points that are arranged to support the crusher body to a structure outside of the body.

14. A method for monitoring and controlling a gyratory or cone crusher, the gyratory or cone crusher comprising a body and a group of arms formed to the body, a main shaft supported from a lower end to the arms, and a support cone supported to the main shaft, wherein decreasing loading of the crusher responsive to bridging is detected with a method comprising the steps of:

receiving measurement information describing stress on the group of arms when supporting the support cone; and detecting bridging formed onto one or more of the group of arms from the measurement information.

15. A gyratory or cone crusher comprising:

a body;

an outer wear part fixed to the body;

a support cone rotatable inside the body via a main shaft);

an inner wear part on a cone surface of the support cone; and a group of arms inside the body and extending inwards from the body;

a main shaft radially supported to the group of arms; and a thrust bearer supported by the group of arms for supporting the main shaft and for axially supporting the support cone via the main shaft;

wherein the crusher is arranged to crush mineral material between the inner wear part and the outer wear part; and a processor having at least one input for receiving measurement information describing stress of the support of the support cone, wherein;

the processor is operable to detect bridging formed onto one or more arms of the group of arms from the measurement information.

16. The gyratory or cone crusher according to claim 15, wherein:

the thrust bearer of the crusher is arranged to be supported by the group of arms with a hydraulic cylinder;

the at least one input of the processor is further arranged to receive, on starting the crusher, the measurement information which is pressure of the hydraulic cylinder; and the processor is further configured to prevent the starting of the crusher if the pressure is below a pre-determined low limit for a floating pressure.

17. The gyratory or cone crusher according to claim 15, wherein:

the thrust bearer of the crusher is arranged to be supported by the group of arms with a hydraulic cylinder;

the at least one input of the processor is arranged to receive the measurement information of pressure of the hydraulic cylinder in connection with a drive of the crusher;

the processor is further configured to detect whether there is material to be crushed in a crushing chamber; and the processor is further configured to stop the crusher, if the processor detects that there is still material to be crushed and the pressure of the hydraulic cylinder is under the pre-determined low limit for a floating pressure.

18. The gyratory or cone crusher according to claim 15, wherein:

the thrust bearer of the crusher is further arranged to be supported by the group of arms with a hydraulic cylinder;

the measurement information comprises a power intake of a drive during crushing;

the processor is further configured to compare the power intake with the pressure; and the processor is further configured to cause stopping the crusher if the power intake with relation to the pressure exceeds a first threshold value.

19. A crushing plant that comprises the crusher according to claim 15.

\* \* \* \* \*